Figure 1:
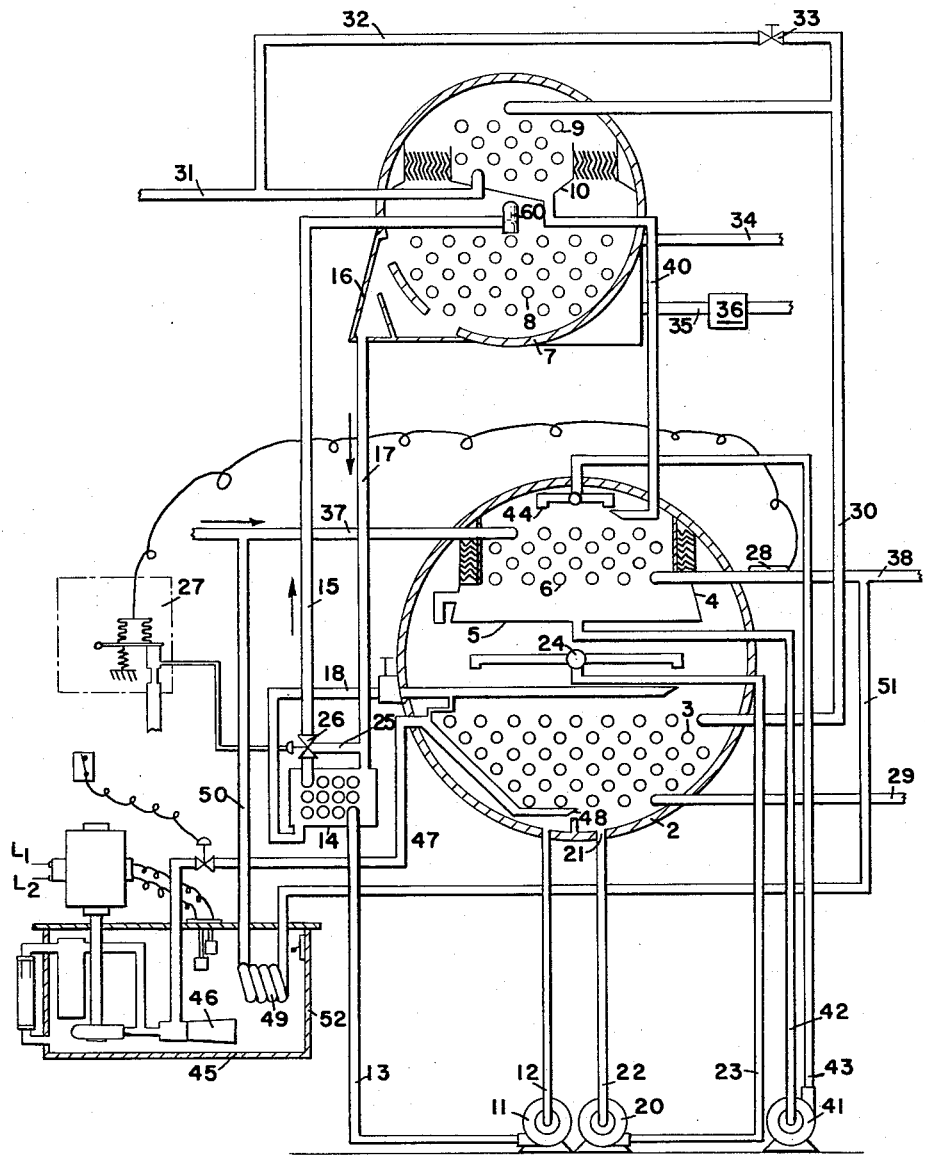

INVENTOR.
LAWRENCE S. BERESIK

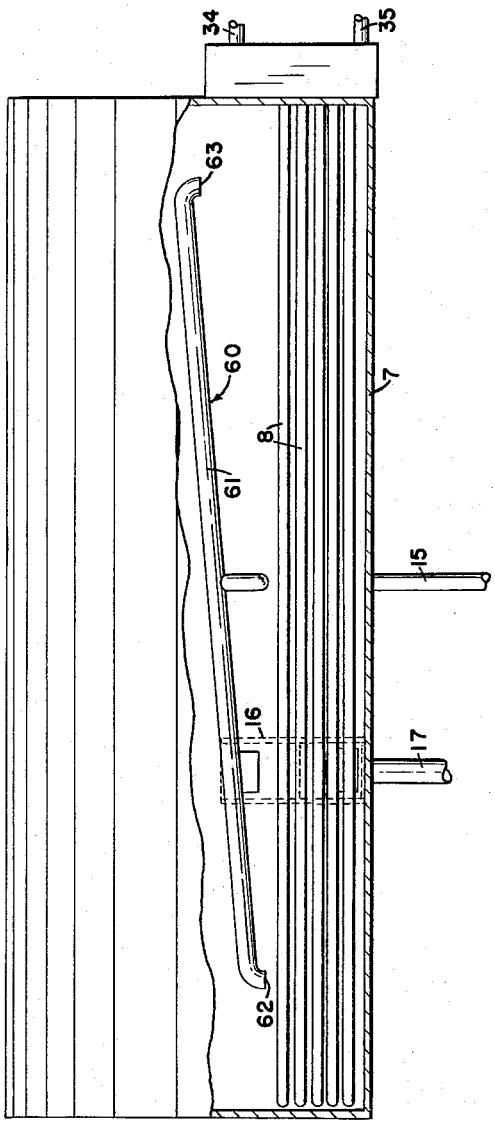

United States Patent Office 2,998,715
Patented Sept. 5, 1961

2,998,715
SOLUTION DISTRIBUTION ARRANGEMENTS FOR ABSORPTION REFRIGERATION SYSTEMS
Lawrence S. Beresik, East Syracuse, N.Y., assignor to Carrier Corporation, Syracuse, N.Y., a corporation of Delaware
Filed Jan. 13, 1960, Ser. No. 2,271
8 Claims. (Cl. 62—476)

This invention relates to solution distribution arrangements for absorption refrigeration systems and, more particularly, to a distribution arrangement for distributing weak solution in the generator of an absorption refrigeration system employ a saline solution as an absorbent, and a medium miscible therewith as a refrigerant.

In the copending application of Louis H. Leonard, Jr., Serial No. 2,203, filed January 13, 1960, entitled "Absorption Refrigeration Systems and Method of Operating the Same," there is disclosed an absorption refrigeration system including a control arrangement adapted upon partial load imposed upon the system to precipitate salt from solution in the generator thereby decreasing the capacity of the system, the control arrangement, upon an increase in load imposed upon the system, permitting solution in the generator to absorb the precipitated salt thereby increasing the capacity of the system. The present invention is concerned with solution distribution means for the generator of such a system designed to prevent cycling of the system during partial load operation.

The chief object of the present invention is to provide an improved solution distribution arrangement for the generator of an absorption refrigeration system.

An object of the invention is to provide an improved solution distribution arrangement for the generator of an absorption refrigeration system designed to prevent cycling during partial load operation. Other objects of the invention will be readily perceived by reference to the following description.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water. Concentration of solution leaving the generator may vary but preferably is about 66% during full load operation of the system.

This invention relates to an absorption refrigeration system comprising, in combination, an absorber, an evaporator, a generator, a condenser, means for supplying weak solution from the absorber to the generator, means for discharging weak solution in the generator, the discharging means comprising a distribution pipe extending longitudinally in the generator having at least one outlet adjacent each end, said pipe being connected to the supply means intermediate its ends and being inclined in a vertical plane to place the outlets in different horizontal planes so that during full load operation weak solution is distributed through both outlets while upon reduction in load imposed upon the system accompanied by reduced weak solution supply to the generator more solution is distributed through one outlet than the other, the quantity of solution distributed through one outlet gradually decreasing upon reduction in load until solution is distributed through the lower outlet only, means for passing strong solution from the generator to the absorber, means for supplying heating medium to the generator, means for supplying condensing medium to the condenser, and means adapted upon partial load imposed on the system to precipitate salt from solution in the generator thereby decreasing the capacity of the system, said precipitating means, upon an increase in load imposed upon the system, permitting the solution discharged in the generator to absorb the precipitated salt thereby increasing the capacity of the system.

The attached drawings illustrate a preferred embodiment of the invention, in which:

FIGURE 1 is a diagrammatic view illustrating an absorption refrigeration system including the solution distribution arrangement of the present invention; and FIGURE 2 is a view partially in elevation and partially in section illustrating the solution distribution arrangement in place in the generator of an absorption refrigeration system.

Referring to the attached drawings, there is illustrated diagrammatically in FIGURE 1 an absorption refrigeration system provided with the solution distribution arrangement of the present invention. The system comprises a shell 2 containing a plurality of tubes 3 which cooperate with the shell to form an absorber. Placed in shell 2 above the absorber is a pan-like member 4 which cooperates with shell 2 to form an evaporator 5. The evaporator includes a plurality of tubes 6 extending longitudinally of the shell above pan 4; medium to be cooled passes through these tubes in heat exchange relation with liquid refrigerant sprayed thereover.

A second shell 7, preferably, is placed above the first shell. Tubes 8 extend in the lower portion of shell 7 and cooperate with shell 7 to form a generator. A plurality of tubes 9 are placed in the upper portion of shell 7 to form a condenser. The tubes 9 cooperate with a pan-like member 10 to form the condenser.

Pump 11 withdraws weak solution from absorber 3 through line 12. Pump 11 forwards weak solution through line 13 to heat exchanger 14 in which the weak solution is placed in heat exchange relation with strong solution returning from the generator, as hereinafter described. The weak solution is then forwarded from the heat exchanger 14 through line 15 to generator 8 being discharged therein through arrangement 60. Spray arrangement 60, preferably, as best shown in FIGURE 2, includes a pipe 61 extending longitudinally of the generator above tubes 8 provided with outlets 62, 63 adjacent each end. Pipe 61 is adjustably connected intermediate its ends and substantially centrally thereof to weak solution line 15, as more fully explained hereafter. Pipe 61 is supported at a desired inclination in a vertical plane to place outlets 62, 63 in different horizontal planes. Lower outlet 62, preferably, is placed closer to overflow arrangement 16, that is, to the nearest outlet of the generator, for more satisfactory partial load operation, since so positioning the lower end of the pipe permits salt to crystallize on those tubes not then covered by solution so that only part of the generator is employed effectively for heat exchange purposes. At full load of the system, weak solution is distributed through both outlets 62, 63. Upon a reduction in load accompanied by reduced weak solution supply to the generator, more solution is distributed through lower outlet 62 than is distributed through upper outlet 63. As load falls off, the quantity of solution supplied to the generator is further reduced until at some desired point of partial load operation all weak solution supplied to the generator is distributed through lower outlet 62 only, no solution being distributed through upper outlet 63. The angle of inclination of pipe 61 is, of course, determined by the point of partial load operation at which it is desired that weak solution be distributed in the generator through lower outlet 62 only. Of course, as load imposed on the system increases, the flow of weak solution to the generator is again increased until at full load operation, weak solution is distributed in the generator substantially uniformly through outlets 62, 63.

Strong solution flows from generator 8 through the overflow arrangement 16, line 17, heat exchanger 14 and line 18 to the absorber, preferably, being discharged therein adjacent one end of shell 2; that is, strong solution flows through forces of gravity from the generator to the absorber. It will be understood, of course, if desired, the strong solution may be discharged in the absorber over the tubes therein.

Pump 20 serves as an absorber pump and is employed to withdraw solution of intermediate concentration from absorber 3 through outlet 21 and line 22. Pump 20 forwards the solution of intermediate concentration through line 23 to the spray arrangement 24 of the absorber. Spray arrangement 24 serves to distribute the recirculated solution over the tubes throughout the length of absorber 3. It will be understood the strong solution mixes to some extent with solution in the absorber and that complete mixing occurs as the pump 20 forwards the mixed solution so that a solution having a concentration intermediate the concentration of the strong and weak solutions is circulated. Reference is made to United States Patent No. 2,840,997, granted July 1, 1958, for a more detailed description of the flow of solution in the system.

A bypass line 25 is placed adjacent heat exchanger 14 and serves to connect line 15 with line 17 on the generator side of the heat exchanger. A three-way modulating valve 26 is placed, preferably, at the juncture of line 25 with line 15, for a purpose hereinafter explained. It is desirable to place valve 26 as close as possible to the heat exchanger 14 to assure that a head exists in the weak solution line. Thus if the valve is modulated to assure that all weak solution flow is through the bypass line 15, and the valve leaks through the weak solution line to the generator, the head in such line will prevent weak solution bleeding to the generator. As indicated in FIGURE 1, valve 26 is a pneumatically operable valve actuated by a control 27 responsive to temperature indicated by a bulb 28. The function and operation of this control arrangement will be described in more detail hereinafter.

Condensing water is forwarded by a pump (not shown) through line 29 to the tubes 3 of the absorber. The condensing water passes from the tubes 3 of the absorber through line 30 to the tubes 9 of the condenser. Condensing water leaves the tubes 9 of the condenser through line 31. A bypass line 32 is provided about the tubes 9 of the condenser extending from line 30 to line 31. A manual valve 33 is placed in bypass line 32. This bypass permits flow of condensing water through the tubes of the condenser to be adjusted at full load when a system is installed. Thereafter, no adjustment of the flow of condensing water through the tubes of the condenser is required.

Steam is supplied to the tubes 8 of the generator through line 34. If desired, a suitable pressure regulating valve (not shown) may be placed in line 34 to assure desired steam pressure in the generator. Ordinarily, however, the system of the present invention employs steam at 12 pounds pressure and steam at such pressure is ordinarily supplied from the usual boilers employed in the industry. Steam condensate leaves the tubes of generator 8 through line 35, a suitable steam-trap 36 being provided in line 35 to assure that only condensate leaves the generator.

Medium to be cooled is forwarded by a pump (not shown) through a line 37 to the tubes 6 of the evaporator. The cooled medium leaves the tubes 6 through line 38 and is forwarded to a place of use such as the central station of an air conditioning system. The medium, after passing through the central station, returns to the evaporator 4 through line 37 to be again cooled and reused. Preferably, bulb 28 of control arrangement 27 is placed on line 38 to reflect the temperature of cooled medium leaving the evaporator which, in effect, indicates the load imposed upon the system.

Condensate leaves pan 10 of the condenser through line 40 and is returned to the evaporator and discharged therein over the tubes 6 to wet the tubes. It will be appreciated the refrigerant is flashed or vaporized by the heat exchange relation with medium passing through the tubes. Flashed vapor passes to the absorber to be absorbed by solution therein.

Pump 41 serves to recirculate liquid refrigerant collected in the evaporator about the evaporator. Pump 41 is connected to the evaporator by line 42 to withdraw liquid refrigerant therefrom. Pump 41 forwards the liquid refrigerant through line 43 to spray arrangement 44 of the evaporator, liquid refrigerant flash-cooling upon discharge in the evaporator, remaining liquid refrigerant wetting the tubes to cool medium passing through the tubes. The heat exchange relation between medium passing through the tubes and the liquid refrigerant on the exterior of the tubes evaporates liquid refrigerant, the vapor passing to the absorber as previously described.

A suitable purge arrangement 45 is provided to remove non-condensible gases from the absorber. The ejector 46 of purge arrangement 45 is connected by line 47 to a purge line 48 extending longitudinally of the absorber. The cooling coil 49 of purge arrangement 45 is connected to line 37 by line 50 and to line 38 by line 51, permitting medium to be employed for cooling solution in the purge tank 52. Purge arrangement 45 is disclosed and claimed in application, Serial No. 565,324 filed February 14, 1956, and reference is made to such application for a more complete description of the purging arrangement.

Considering the control arrangement for the present absorption refrigeration system, as previously described, bypass line 25 connects weak solution line 15 and strong solution line 17 adjacent the heat exchanger 14, modulating three-way valve 26 being placed at the juncture of bypass line 25 and weak solution line 15 to proportion the quantities of weak solution flowing through such lines. It will be understood that weak solution flow to the heat exchanger is constant under all load conditions. Valve 26 is connected to a pneumatic control 27 which in turn is actuated by means of a bulb 28 placed adjacent line 38 in a position to sense the temperature of cooled medium leaving the evaporator. It will be appreciated bulb 28 may be placed in contact with line 38 or may be placed in line 38, as desired. Valve 26 is so designed as to prevent air leakage into the machine.

Under full load condition, all weak solution passes through line 15 to the generator and is supplied therein to pipe 61, being distributed in the generator through outlets 62, 63. However, as the load imposed on the system decreases as reflected by the temperature of chilled water leaving the evaporator, valve 26 is actuated to divert a portion of the flow through the weak solution line through bypass line 25 to the strong solution line 17. Depending upon the quantity of weak solution diverted through bypass line 25, lower outlet 62 may distribute more solution in the generator than upper outlet 63 or if the quantity is substantially reduced lower outlet 62 may distribute all solution supplied to the generator, upper outlet 63 not distributing any solution in the generator.

So diverting weak solution varies the concentration of solution supplied to the absorber in accordance with cooled medium requirements. Generally speaking, only enough solution is sent to the generator for reconcentration as is required to keep the absorber solution at the desired concentration to meet load requirements. Although the generator produces extremely high concentrations of salt under part load conditions, heretofore considered unsafe due to crystallization problems in the solution heat exchanger, the fact that the highly concentrated salt solution leaving the generator is immediately diluted with extremely dilute solution prevents solidification problems in the heat exchanger.

While I have described the control arrangement of the present invention as being a pneumatic control, it will be appreciated that any electrical or electronically operated controls may be provided.

Considering the operation of the absorption refrigeration system, it will be appreciated that the machine is designed to operate at a desired steam pressure, for example, 12 pounds, because most existing steam boilers are designed to provide steam at such pressure. It will be appreciated other pressures may, of course, be used and in such case a pressure regulating valve may be placed in the steam line to assure that steam at the desired pressure is provided to the generator. I have described too a bypass about the tubes of the condenser for condensing water. It will be appreciated that in many cases such bypass is not necessary, but that it is desirable in order to adjust the machine to operation at full load conditions. After the machine is adjusted to operation at full load conditions, the condenser bypass need not be actuated for further operation. If desired, of course, for this purpose steam pressure may be varied.

Considering operation of the absorption refrigeration system, it will be appreciated that at start-up the generator contains a large amount of precipitated or crystallized lithium bromide salt. In some cases, it appears as if the generator tubes were covered with a pile of white snow. It will be appreciated there is no need for manual or automatic steam vlaves to be closed during the shutdown period since the low thermal conductivity of the solid salt serves as an excellent insulator to shield the generator from the hot steam in the tube. Under such conditions, the salt will dissolve at least partially during shutdown if the valve is closed which is desirable. The solution in the remainder of the system including the heat exchanger is under extremely dilute conditions. When the machine is started, medium to be cooled is forwarded through line 37 to the tubes 6 of evaporator 4 and leaves the tubes 6 of evaporator 4 through line 29. At start-up, the pumps are actuated, pump 11 withdrawing weak solution from the absorber through line 12 and forwarding the weak solution through line 13, heat exchanger 14 and line 15 to generator 8. Initially, the weak solution supplied to the generator is distributed therein through outlet 62 only. It will be appreciated valve 26 gradually opens to permit full solution flow to the generator, and at full solution flow, outlets 62, 63 distribute substantially equal quantities of solution in the generator.

In the generator, the solution flows over the top of the salt pile gradually dissolving the solid salt and returning the concentrated solution to the absorber where it can immediately go to work to produce useful refrigeration. It will be appreciated that instead of needing to wait for the overall solution concentration in the machine to build up, the latent capacity of the stored solid salt in the generator is instantly ready to go to work. This is virtually impossible with any other type of control arrangement.

Refrigerant vapor is boiled from the solution in the generator 8, vapor passing to condenser 9 and being condensed therein, the condensate returning to the evaporator through line 40.

Strong solution leaves the generator through overflow arrangement 16, line 17, heat exchanger 14, line 18 and is discharged preferably over an end of the absorber tube bundle. Strong solution is flash-cooled to some slight extent as it is discharged in the absorber. The discharged strong solution mixes with solution in the absorber and is withdrawn from the absorber through outlet 21 and line 22 by pump 20, solution of intermediate concentration so formed being returned to the absorber through line 23 and being sprayed over the tube bundle by spray arrangement 24. It will be appreciated that the mixture of strong solution and solution in the absorber forming the solution of intermediate concentration is further mixed and cooled in passage through the refrigeration system.

Pump 41 serves to withdraw liquid refrigerant from the pan 5 of evaporator 4, and to recirculate the liquid refrigerant through lines 42 and 43 to the discharge means 44 of the evaporator. The discharge means 44 sprays the liquid refrigerant over the tubes 6 of evaporator 4. The tubes are wetted by the liquid refrigerant, the wetted refrigerant being vaporized by the heat exchange relation with medium passing through the tubes. Vapor so formed passes outwardly through the eliminators and flows downward to the absorber 3 being absorbed by solution therein.

Vapor condensate is returned from condenser 9 through line 40 to the evaporator being flash-cooled upon discharge therein over tube 6. Thus, the vapor condensate aids in wetting the tubes to cool the medium passing therethrough.

Now, considering operation at full load conditions, the cooled medium rapidly cools down to design conditions and valve 26 remains open to permit the full volume of weak solution to be supplied to the generator to dissolve the solid salt. Assuming the system goes on operation at partial load as indicated by a decrease in the temperature of cooled medium leaving the evaporator reflected by bulb 28, control 27 actuates valve 26 to throttle flow of weak solution to the generator and to bypass some portion of the weak solution to the strong solution line 17 where it mixes with the strong solution prior to the entrance of the solution into the heat exchanger 14. As the weak solution flow to the generator is reduced, and more solution is bypassed or diverted, the solution concentration in the generator gradually decreases, at approximately 50% load approaching the consistency of thick syrup. At approximately 25% load, it appears to be a thick slush. Even though the solution in the generator begins to increase in concentration as soon as the system beings to operate on partial load, the solution leaving the generator is diluted to more than a safe concentration before it reaches the heat exchanger by the addition of weak solution thereto thus preventing precipitation or crystallization in the heat exchanger. In one sense, the present arrangement may be considered as the circulation of solution at zero load with the addition of solid salt or slush thereto as required to provide a solution of higher concentration as the load imposed upon the system increases, that is, to maintain a desired concentration in accordance with the load imposed on the system.

The distribution arrangement of the present invention is economical in cost and satisfactorily distributes solution in the generator of the absorption refrigeration system even at extreme conditions of partial load. The arrangement so provided prevents cycling of the control arrangement under low load conditions thus assuring satisfactory operation of the system and increasing the life of the control members without incurring additional costs of manufacture.

While I have described a preferred embodiment of the invention, it will be appreciated the invention is not so limited since it may be otherwise embodied within the scope of the following claims.

I claim:

1. In an absorption refrigeration system, the combination of an absorber, an evaporator, a generator, a condenser, means for supplying weak solution from the absorber to the generator, means for discharging weak solution in the generator, the discharging means comprising a distribution pipe extending longitudinally in the generator having at least one outlet adjacent each end, said pipe being connected to the supply means intermediate its ends and being inclined in a vertical plane to place the outlets in different horizontal planes so that during full load operations weak solution is distributed through both outlets while upon reduction in load imposed upon the system accompanied by reduced weak solution supply to the generator more solution is distributed through one outlet than the other, the quantity of solution distributed through one outlet gradually decreasing as the quantity of weak solution supplied to the generator gradually decreases upon reduction in load until solution is distributed through the lower outlet only, means for passing strong solution from the generator to the absorber, means for supplying heating medium to the generator, means for supplying condensing medium to the condenser, and means adapted upon partial load imposed on the system to precipitate salt from solution in the generator thereby decreasing the capacity of the system, said precipitating means, upon an increase in load imposed upon the system, permitting the solution discharged in the generator to absorb the precipitated salt thereby increasing the capacity of the system.

2. An absorption refrigeration system according to claim 1 in which the distribution pipe is connected to the supply means substantially centrally of the distribution pipe.

3. An absorption refrigeration system according to claim 2 in which the angle of inclination of the pipe is determined by the point of partial load operation at which it is desired that all weak solution supplied to the pipe be discharged through the lower outlet.

4. An absorption refrigeration system according to claim 3 in which the distribution pipe is adjustably connected to the supply means to permit variation in its angle of inclination.

5. In an absorption refrigeration system, the combination of an absorber, an evaporator, a generator, a condenser, a heat exchanger to place strong and weak solutions in heat exchange relation, a first line connecting the absorber with the generator through the heat exchanger, means for passing weak solution through the first line, means connected to the first line for discharging weak solution in the generator, the discharging means comprising a distribution pipe extending longitudinally in the generator having at least one outlet adjacent each end, said pipe being connected to the first line intermediate its ends and being inclined in a vertical plane to place the outlets in different horizontal planes so that during full load operation weak solution is distributed through both outlets while upon reduction in load imposed upon the system accompanied by reduced weak solution supply to the generator more solution is distributed through one outlet than the other, the quantity of solution distributed through one outlet gradually decreasing as the quantity of weak solution supplied to the generator gradually decreases upon reduction in load until solution is distributed through the lower outlet only, a second line connecting the generator with the absorber through the heat exchanger permitting the supply of strong solution from the generator to the absorber, means for supplying condensing medium to the condenser, means for supplying heating medium to the generator, a third line connecting the first line and the second line, a modulating valve placed at the juncture of the first and third lines, and a control to actuate said valve, said control being responsive to the temperature of cooled medium leaving the evaporator to actuate the valve to vary the amount of weak solution mixed with strong solution in the strong solution line prior to the passage of strong solution through the heat exchanger.

6. An absorption refrigeration system according to claim 5 in which the distribution pipe is connected to the first line substantially centrally of the distribution pipe.

7. An absorption refrigeration system according to claim 6 in which the distribution pipe is adjustably connected to the first line to permit variation in its angle of inclination.

8. A solution distribution arrangement to be disposed in the generator of an absorption refrigeration machine for distributing weak solution in the generator of the absorption refrigeration machine which comprises a distribution pipe extending longitudinally in the generator having at least one outlet adjacent each end, the pipe being connected to weak solution supply means intermediate its ends and being inclined in a vertical plane to place the outlets in different horizontal planes so that upon a gradual decrease in solution flow to the pipe the quantity of solution distributed through one outlet is gradually decreased while solution is distributed through the lower outlet only.

References Cited in the file of this patent

UNITED STATES PATENTS

| 1,798,946 | Maivri | Mar. 31, 1931 |
| 2,755,635 | Bourne | July 24, 1956 |